United States Patent [19]
Wu

[11] Patent Number: 5,813,808
[45] Date of Patent: Sep. 29, 1998

[54] EXPANSION SCREW HAVING OVERLAPPING EXPANDING ELEMENTS

[76] Inventor: Ming-Hsin Wu, 14 Fl., No. 494, Sec. 2, Hsin-Chin Rd., Hsin Ying City, Tainan Hsien, Taiwan

[21] Appl. No.: 738,491

[22] Filed: Oct. 28, 1996

[51] Int. Cl.$^6$ .................................................. F16B 13/04
[52] U.S. Cl. .............................. 411/32; 411/24; 411/42; 411/33
[58] Field of Search .................... 411/24, 25, 27, 411/32, 33, 55, 60, 42, 72

[56] References Cited

U.S. PATENT DOCUMENTS

| 1,278,025 | 9/1918 | Salmons | 411/32 |
| 3,448,651 | 6/1969 | Passer | 411/42 |
| 4,293,259 | 10/1981 | Leibig | 411/32 |
| 4,380,407 | 4/1983 | Donan | 411/25 |
| 4,702,654 | 10/1987 | Frischmann | 411/55 |

FOREIGN PATENT DOCUMENTS

| 1182655 | 6/1955 | France | 411/55 |
| 343992 | 3/1931 | United Kingdom | 411/24 |

*Primary Examiner*—Flemming Saether
*Attorney, Agent, or Firm*—Bacon & Thomas

[57] ABSTRACT

A forward and reverse expanding type expansion screw has a bolt, a nut, a forward expanding plug, a retaining tapered ring, and a backward expanding plug. By inserting the bolt through the forward expanding plug, the retaining tapered ring and the reverse expanding plug in order, the expansion screw can be inserted into a wall hole, the bolt can be driven to lock to the nut, the reverse expanding plug first expanding in the reverse direction by a pushing effect caused by the retaining tapered ring, and then the forward expanding plug is pushed forward and expanded in the forward direction. By expanding in opposite directions a cross expanding and squeezing effect is achieved to provide a very stable securing effect. A two-way sleeve and connecting sleeves may be further connected to provide fixed points for the expansion of the plugs and to extend the length of the expansion screw to meet different requirements.

9 Claims, 10 Drawing Sheets

5,813,808

EXPANSION SCREW HAVING OVERLAPPING EXPANDING ELEMENTS

BACKGROUND OF THE INVENTION (a) Field of the Invention

The present invention relates to a forward and reverse expanding type expansion screw comprising at least a bolt, a nut, a forward expanding plug, a retaining tapered ring and a reverse expanding plug, particularly the design of the forward and reversing expanding plugs to provide a crossing expanding effect to the best securing effect.

(b) Description of the Prior Art

As shown in FIG. 1, the conventional expansion screw comprises mainly a bolt 10, a plug 20, a nut 30 and a washer 40. The plug 20 is formed with a plurality of slots 201 at its rear section for expansion and deformation upon pushing force of the bolt 10 while a force is applied to the bolt's head 101 so that the expansion screw can be firmly fixed to a wall hole. In such a design the plug is expanded only in the forward direction, the extent of expansion is limited, the expansion screw can't be firmly fixed to hollow brick or soft wall material, and the whole expansion screw can be easily removed simply by pulling it out of the wall for its expansion effect is not satisfactory.

SUMMARY OF THE INVENTION

The main objective of the present invention is to provide a forward and reverse expanding type expansion screw comprising basically a bolt, a nut, a forward expanding plug, a retaining tapered ring, and a backward expanding plug. By inserting the bolt to the forward expanding plug, the retaining tapered ring and the reverse expanding plug in order, the whole set of the expansion screw can be inserted to a wall hole, the bolt can be driven to lock to the nut, whereby the reverse expanding plug is first expanding in the reverse direction by a pushing effect caused by the retaining tapered ring, and then the forward expanding plug is pushed forward and expanding in the forward direction. By the forward and reverse expanding in opposite directions a cross expanding and squeezing effect is achieved to provide a very stable securing effect.

Another objective of the present invention is to provide a forward and reverse expanding type expansion screw which permits replacement of the bolt and nut in different combinations so that the bolt can be inserted to the forward expanding plug, the retaining tapered ring and the reverse expanding plug in order or in reverse order for use in hanging of a suspended article.

Another objective of the present invention is to provide a forward and reverse expanding type expansion screw with a two-way sleeve between the said forward expanding plug and the reverse expanding plug together with two retaining tapered rings to serve as a fixed point during the forward and reverse expanding to provide an outstanding securing effect.

Another objective of the present invention is to provide a forward and reverse expanding type expansion screw with one or more connecting sleeves with keys and slots to connect to the forward expanding plug and the reverse expanding plug respectively so as to cause the forward and reverse expanding plugs to be expanded at solid parts of the wall hole to provide firm and effective securing effect.

BRIEF DESCRIPTION OF THE DRAWINGS

The invention, as well as its many advantages, may be further understood by the following detailed description and drawings in which:

FIG. 5(A) is a rear view of the reverse expansion sleeve in the embodiment shown in FIG. 5;

DETAILED DESCRIPTION OF THE PREFERRED EMBODIMENTS

Figure 1:
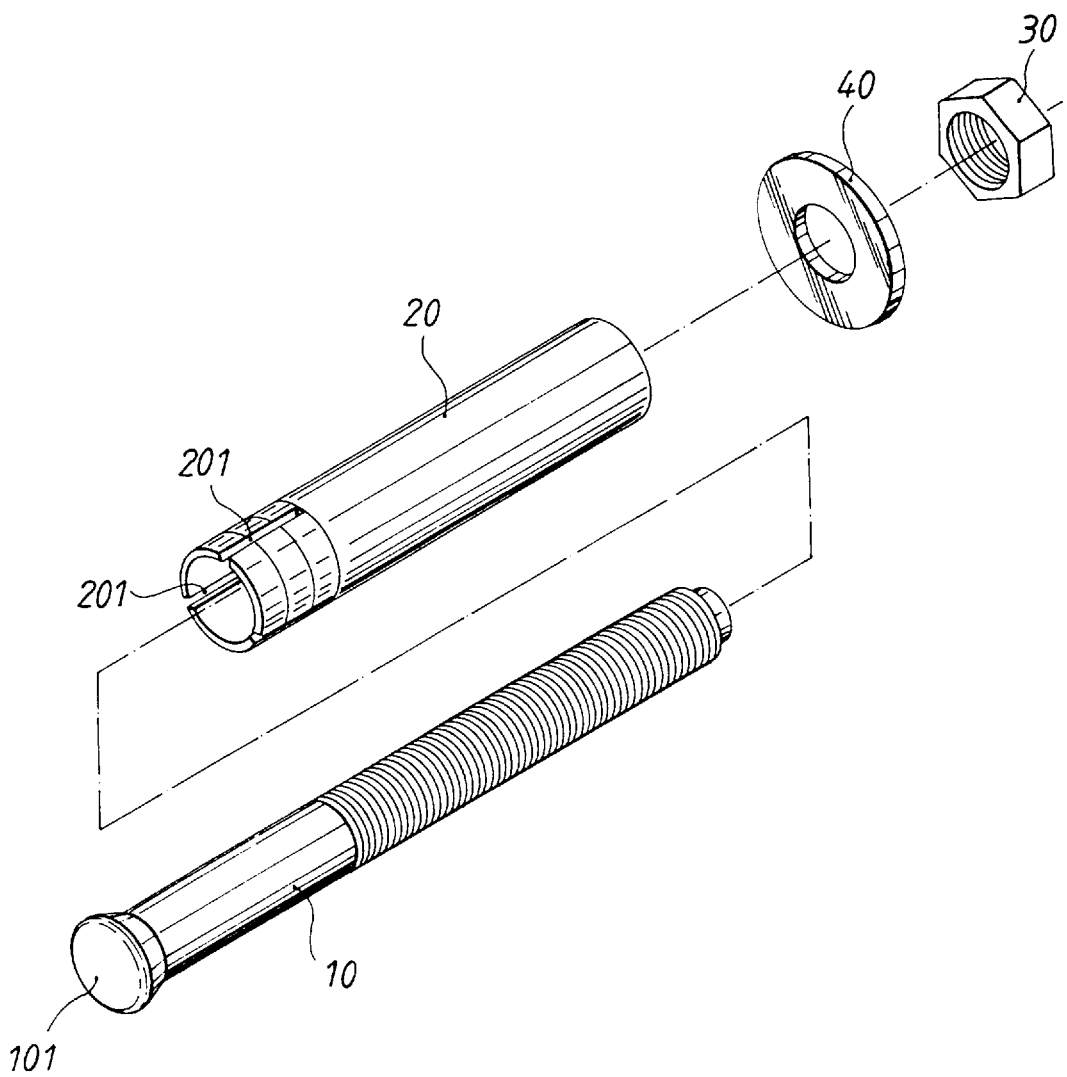
FIG. 1 is a perspective developed view of a conventional expanding screw.
Figure 2:
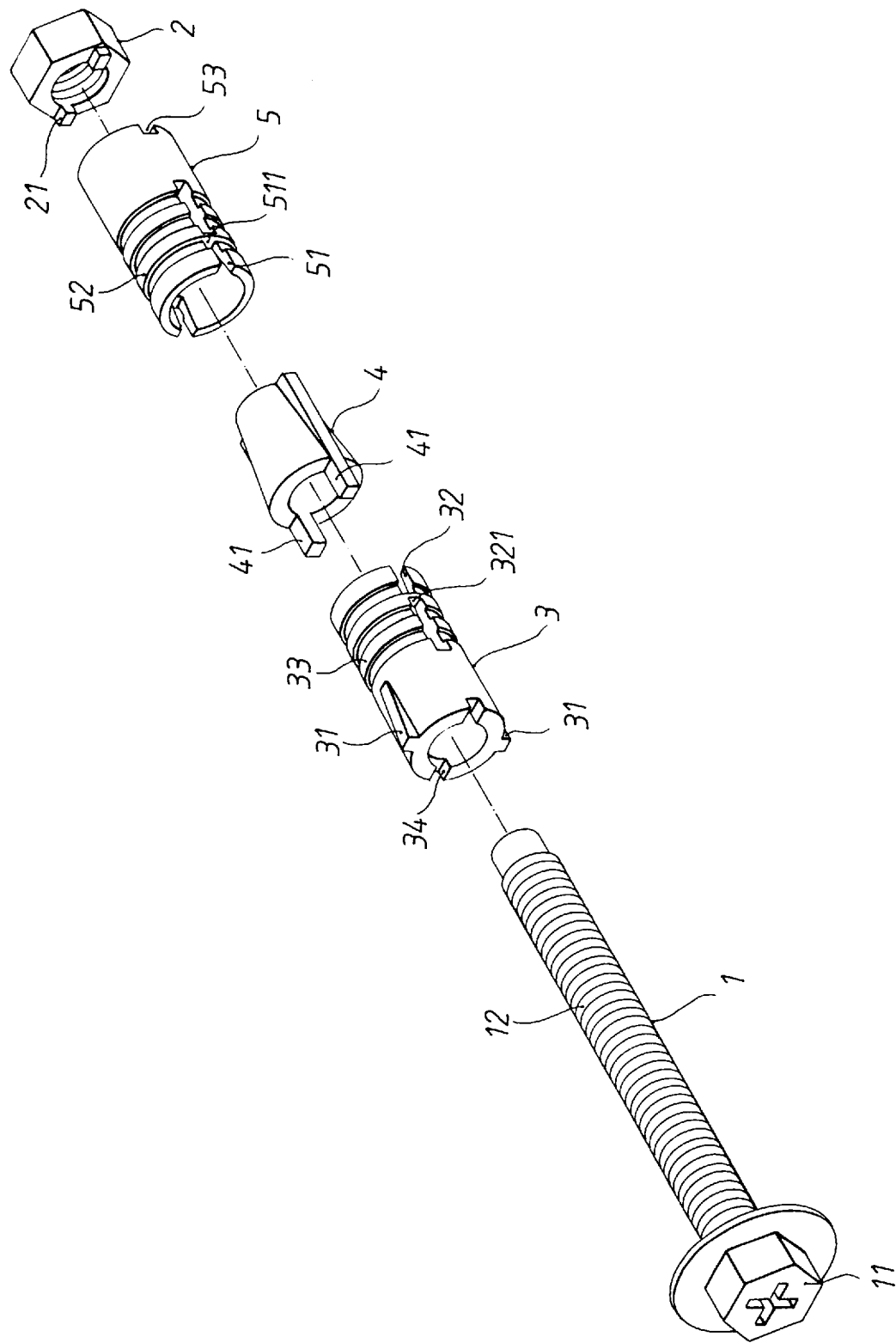
FIG. 2 is a perspective developed view of a basic embodiment of a forward and reverse expanding type expansion screw according to the present invention.
Figure 3:
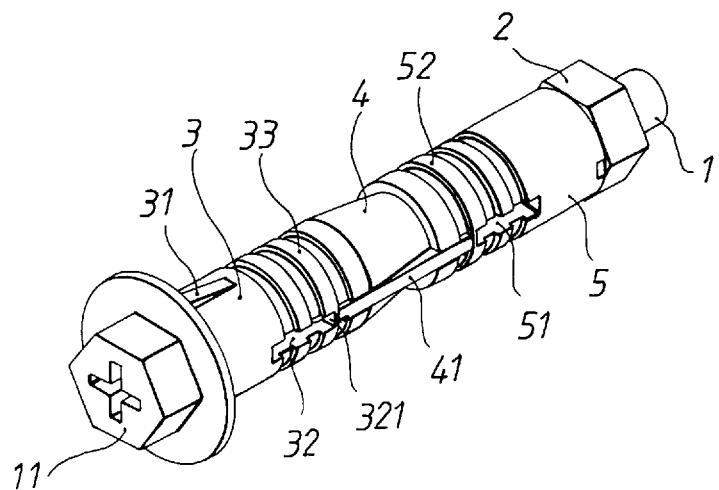
FIG. 3 is a perspective view of an assembly of the expansion screw in FIG. 2 prior to expansion.
Figure 4:
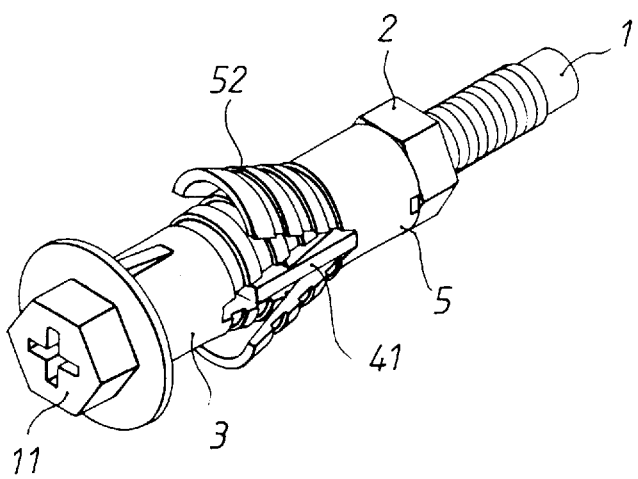
FIG. 4 is a perspective view of an assembly of the expansion screw in FIG. 2 after expansion.

As shown in FIGS. 2 through 4, the present invention comprises basically a bolt 1, a nut 2, a forward expanding plug 3, a retaining tapered ring 4, and a reverse expanding plug 5.

The bolt 1 has a cross head or flat head 11 and a threaded section 12. It can be of any other shape to meet different need as described below.

The nut 2 is a hexagon net with two symmetric keys on its front end.

The forward expanding plug 3 is to be placed at the front end of the bolt 1. It is a cylindrical sleeve structure with two inward declined symmetric wings 31 extended from its front section wall, and two symmetric slots 32 at its rear section wall. The outer wall of each symmetric slot 32 can be further designed with a plurality of engaging grooves 33. To fit with an extension of a connecting sleeve 7 to be described below, two connecting slots 34 are formed at the front wall of the front section wall of the forward expanding plug 3.

The retaining tapered ring 4 is an annular sleeve structure with a tapered inner wall. It is connected to the rear end of the forward expanding sleeve 3. The retaining tapered ring 4 has two symmetric blocks 41 extended from its front end. These two symmetric blocks 41 are extended backwards to the tapered annular wall.

The backward expanding plug 5 is to be placed at the rear section of the bolt 1. It is a cylindrical sleeve structure with two symmetric slots 51 at its front section wall. The outer wall of the slots 51 can be further designed with a plurality of engaging grooves 52, and the end of its rear section can be designed with two symmetric slots 53 for fitting with the two keys 21 of the aforesaid nut 2.

Figure 12:
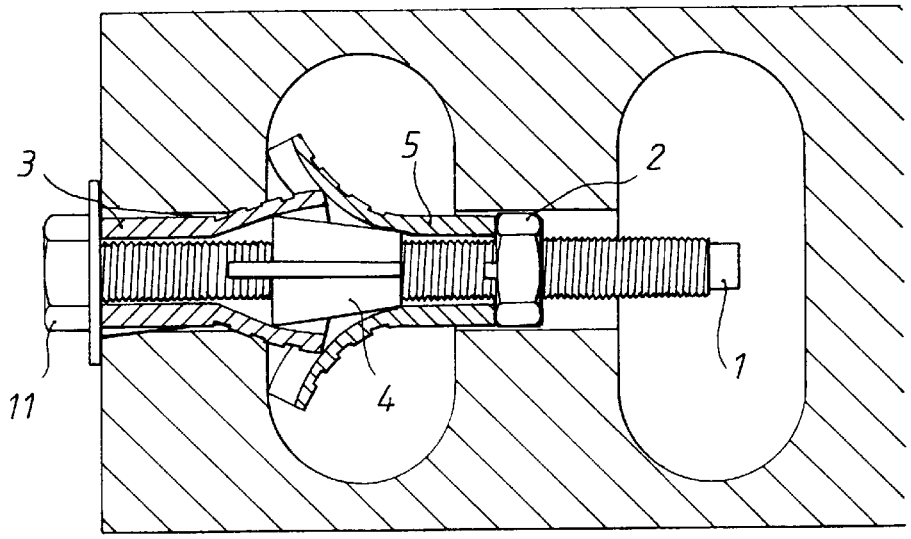
FIG. 12 is a sectional view illustrating application of the basic embodiment of the present invention in hollow brick.
Figure 11:
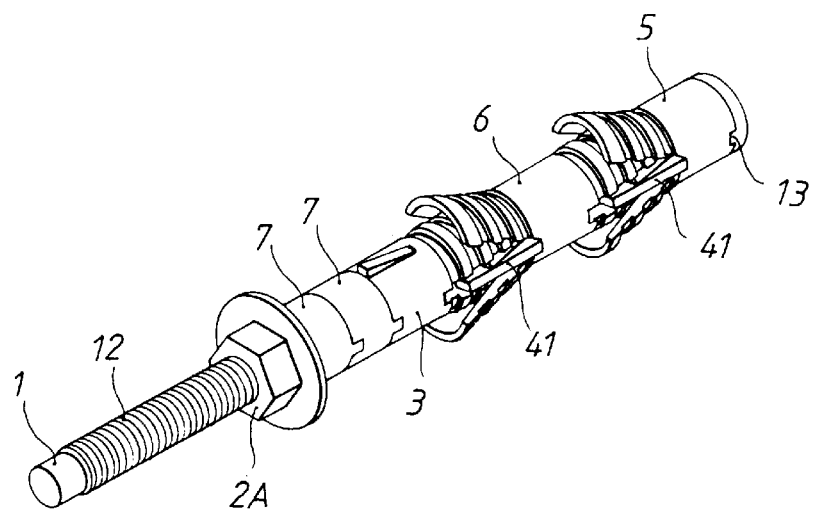
FIG. 11 is a perspective view of an assembly of the embodiment shown in FIG. 10.

With the aforesaid components, the bolt 1 is inserted into the forward expanding plug 3, the retaining tapered ring 4 and the reverse expanding plug 5, and then the end of the bolt 1 is fitted with the nut 2, as shown in FIG. 3. After the whole set of the expansion screw according to the present invention is inserted into a wall hole, the bolt 1 can be driven to lock to the nut 2, whereby the reverse expanding plug is first expanding in the reverse direction by a pushing effect caused by the retaining tapered ring 4, and then the forward expanding plug 3 is pushed forward and expanding in the forward direction. By the forward and reverse expanding in opposite directions as shown in FIG. 4 and FIG. 12, a cross expanding and squeezing effect is achieved to provide a very stable securing effect.

Figure 5:
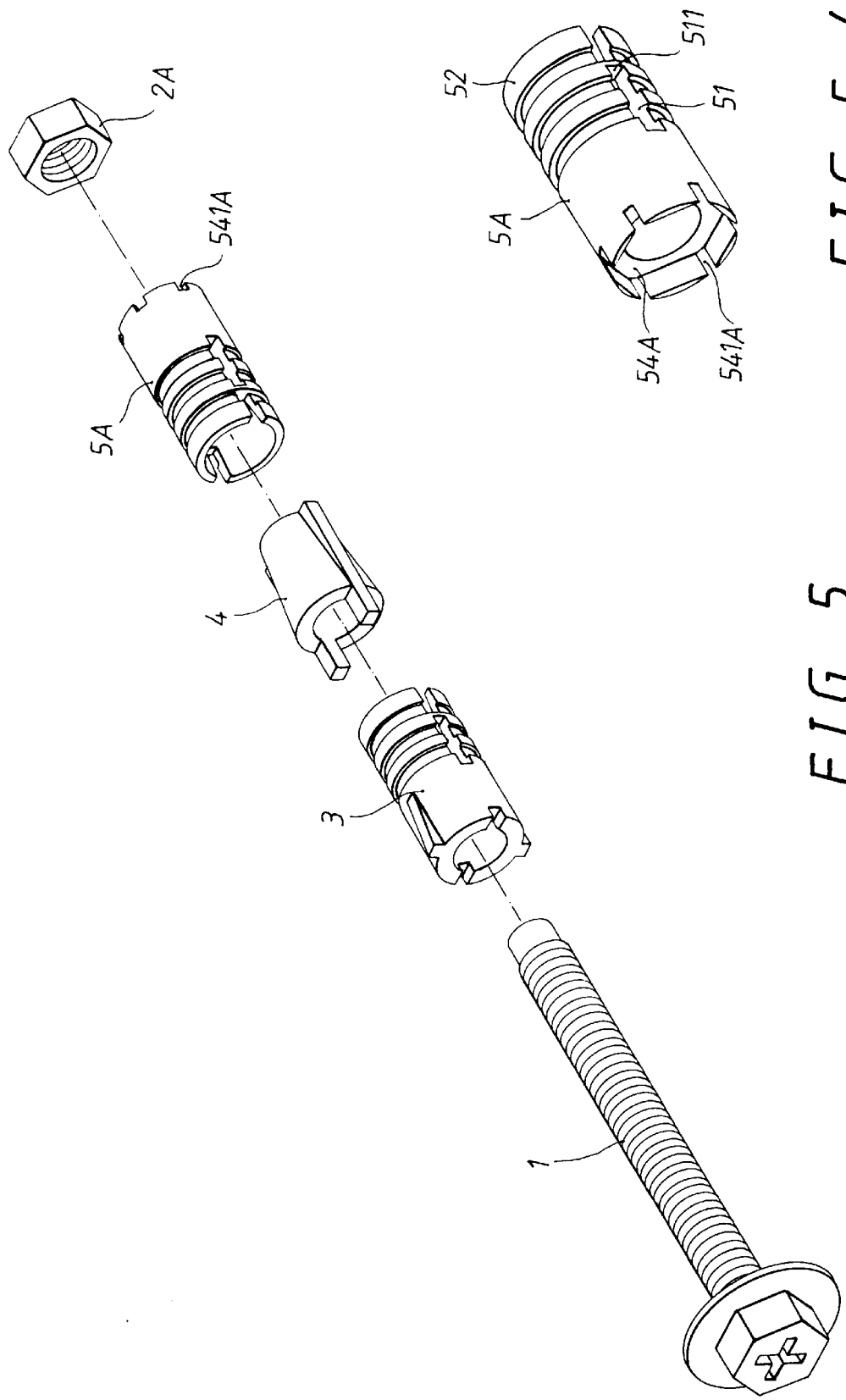
FIG. 5 is a perspective developed view of another embodiment of the present invention with a change of the design of the reverse expanding plug.

The connection between the reverse expanding plug 5 and the nut 2 is mainly by seizing of the keys in the slots 53. As the nut 2 itself is maintained fixed, the bolt 1 is firmly secured thereto as soon as it is locked by the nut 2. Similarly, as shown in FIGS. 5 and 5(A), the rear end of the reverse expanding plug 5A is formed with a hexagon nut holder 54A to seize a nut 2A without the keys 21 for the same locking effect. The hexagon nut holder 54A can be made by forming of a plurality of openings 541A around the circumference of the rear end so as to seize and retain a nut of specified size. By this way, the wall thickness required for the reverse expanding plug can be reduced and material can be saved accordingly.

Figure 6:
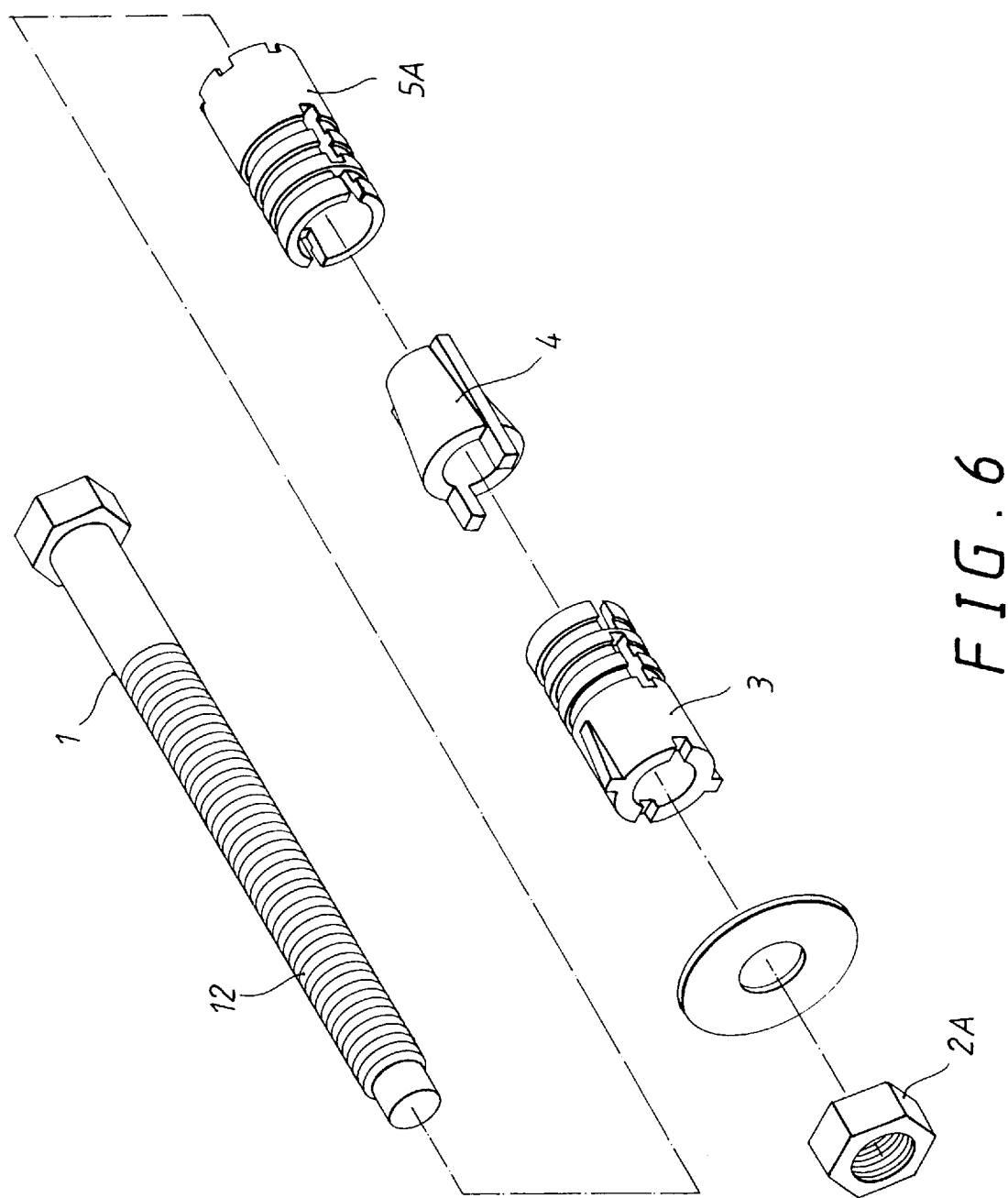
FIG. 6 is a perspective developed view illustrating insertion of the bolt in reverse order.
Figure 7:
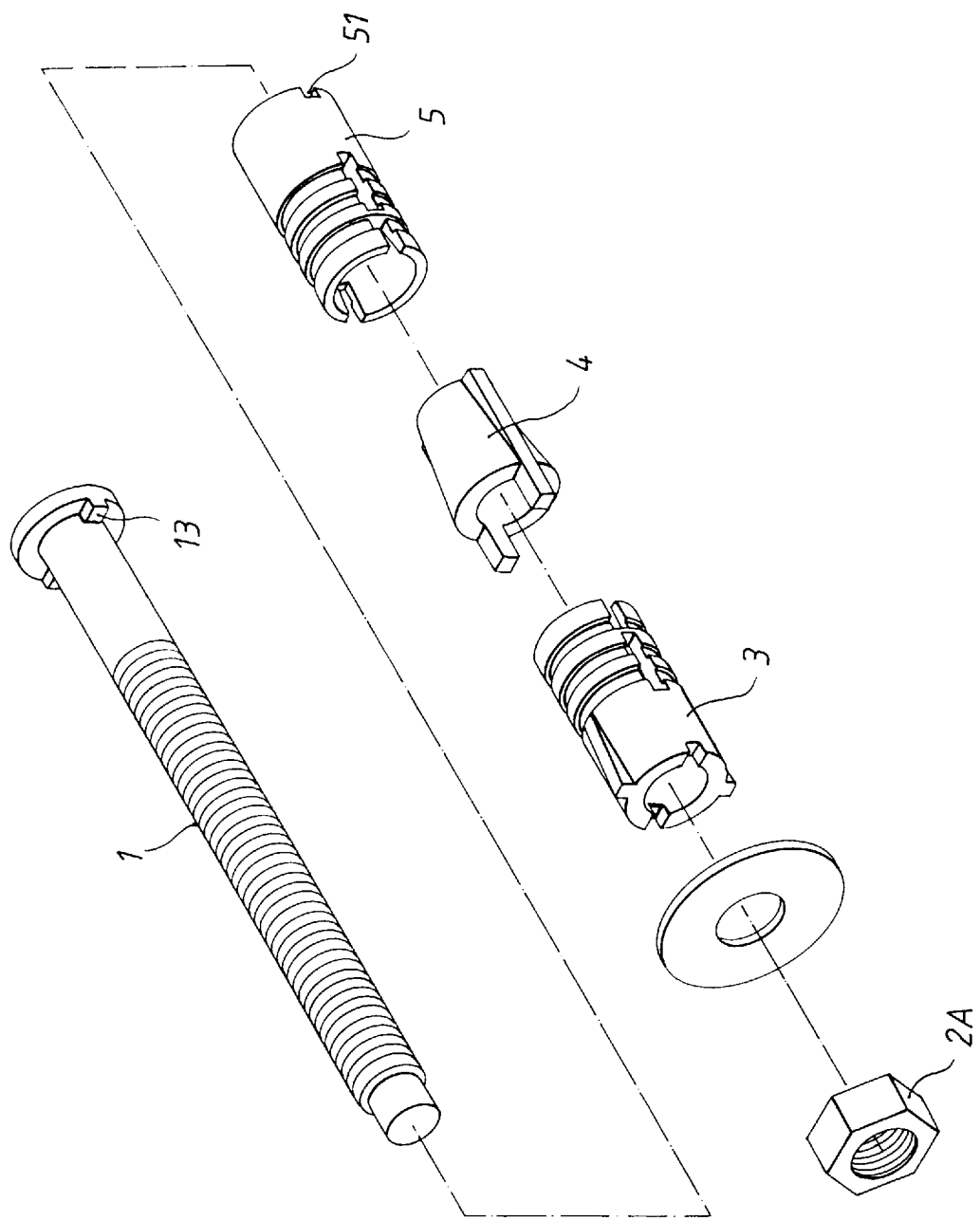
FIG. 7 is a perspective developed view illustrating connection of the bolt to the nut in the embodiment shown in FIG. 6.

Moreover, as required for a particular execution, the assembly of the bolt and the nut can be changed. As shown in FIG. 6, the bolt 1 can be inserted in the reverse order, i.e., to the reverse expanding plug 5A, the retaining tapered ring 4 and then the forward expanding plug 3. In this assembly, the head of the bolt 1 can be embedded at the nut holder at the reverse expanding plug 5A, or the head of the bolt 1 may be designed with two symmetric keys 13 for seizing by the corresponding slots 51 at the reverse expanding plug 5 as shown in FIG. 7, while the nut 2A is fitted to the bolt 1, the bolt 1 has a threaded section exposed on the wall, and the nut 2A is exposed on the wall consequently. Such a design is particularly useful for fitting of suspending article such as basin in rest room.

The aforesaid forward expanding plug 3 and the reverse expanding plug 5 can be made of plastic material by injection forming process. Their corresponding slots 32 and 51 can be further designed with connecting ribs 321 and 511 to provide stop effect during assembly of the whole expansion screw to prevent from unwanted expansion before it is put in use. When the whole expansion screw is put into a wall hole, the tightening of the bolt 1 to the nut 2 can cause a great expansion and squeezing effect which can consequently break the connecting ribs 321 and 511 for further expansion.

Figure 8:
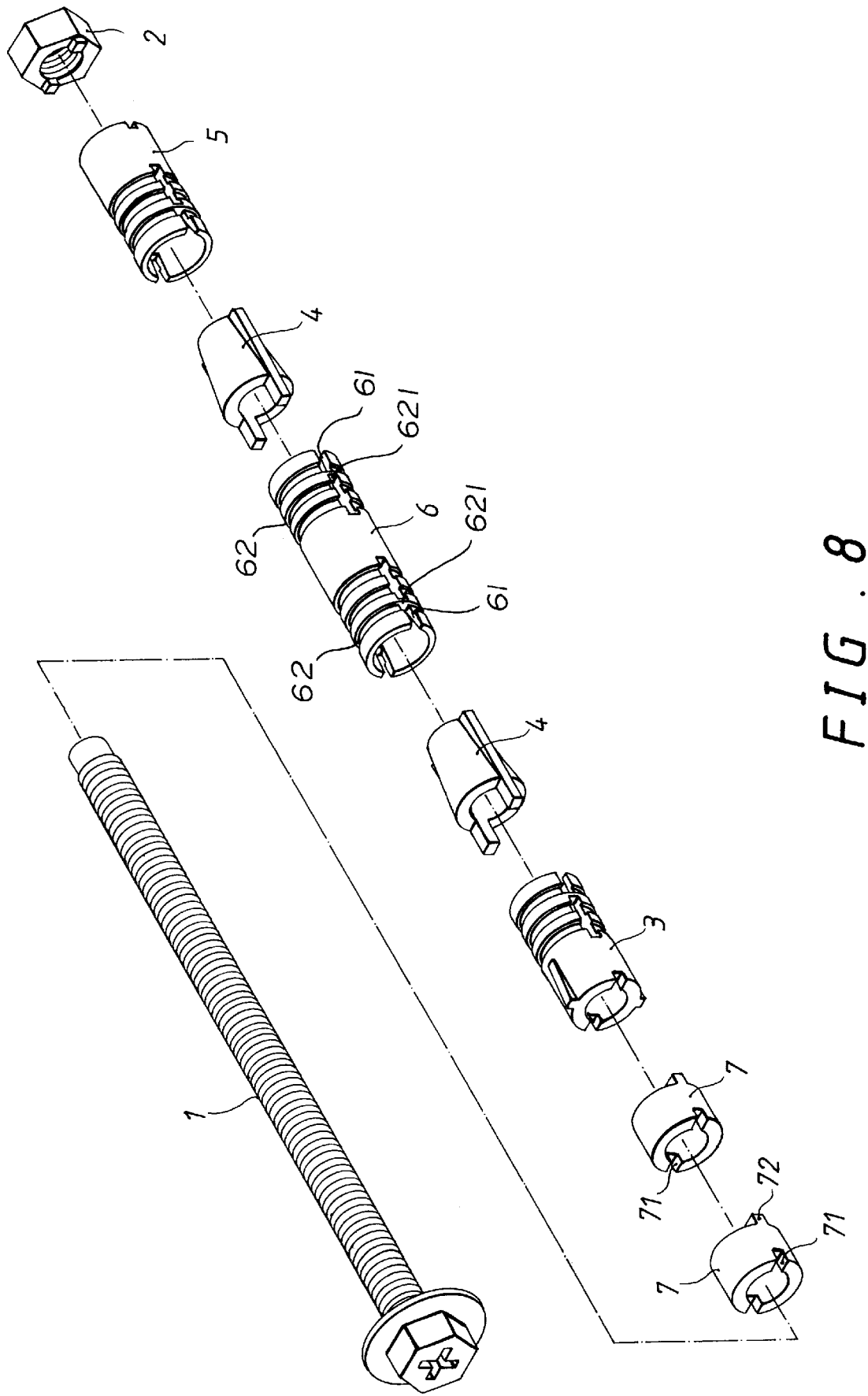
FIG. 8 is a perspective developed view illustrating addition of a two-way sleeve and a connecting sleeve to the embodiment of the present invention.

FIG. 8 shows another embodiment of the present invention. It has a two-way sleeve 6 in addition to that described in the basic embodiment. The two-way sleeve 6 is to be placed between the forward expanding plug 3 and the reverse expanding plug 5, with a retaining tapered ring 4 at each end to ease connection. The two-way sleeve 6 is a cylindrical sleeve structure, it has two symmetric slots 61 at the front end and another two symmetric slots 61 at the rear end. On the outer walls of such slots 61 appropriate engaging grooves 62 are formed to engage with the respective blocks 41 on the retaining tapered ring 4. With the two-way sleeve 6 in place, the two-way sleeve 6 keeps contact with the forward expanding plug 3 and the reverse expanding plug respectively and serves as a fixed point during the forward and reverse expanding to provide an outstanding securing effect. Similarly, the slots 61 at the two-way sleeve 6 can be designed with connecting ribs 621 to prevent from unwanted expansion.

As shown in FIGS. 8–11, one or more connecting sleeves 7 can be added to the aforesaid embodiments when the expansion screw is used for wall hole having a considerable depth, or wall hole in hollow brick or soil material. The connecting sleeve 7 has two symmetric slots 71 at the front end and two symmetric keys 72 at the rear end for connecting to the front end of the forward expanding plug 3 or the reverse expanding plug 5 as extension component for insertion of the bolt 1 to meet the actual need.

Figure 9:
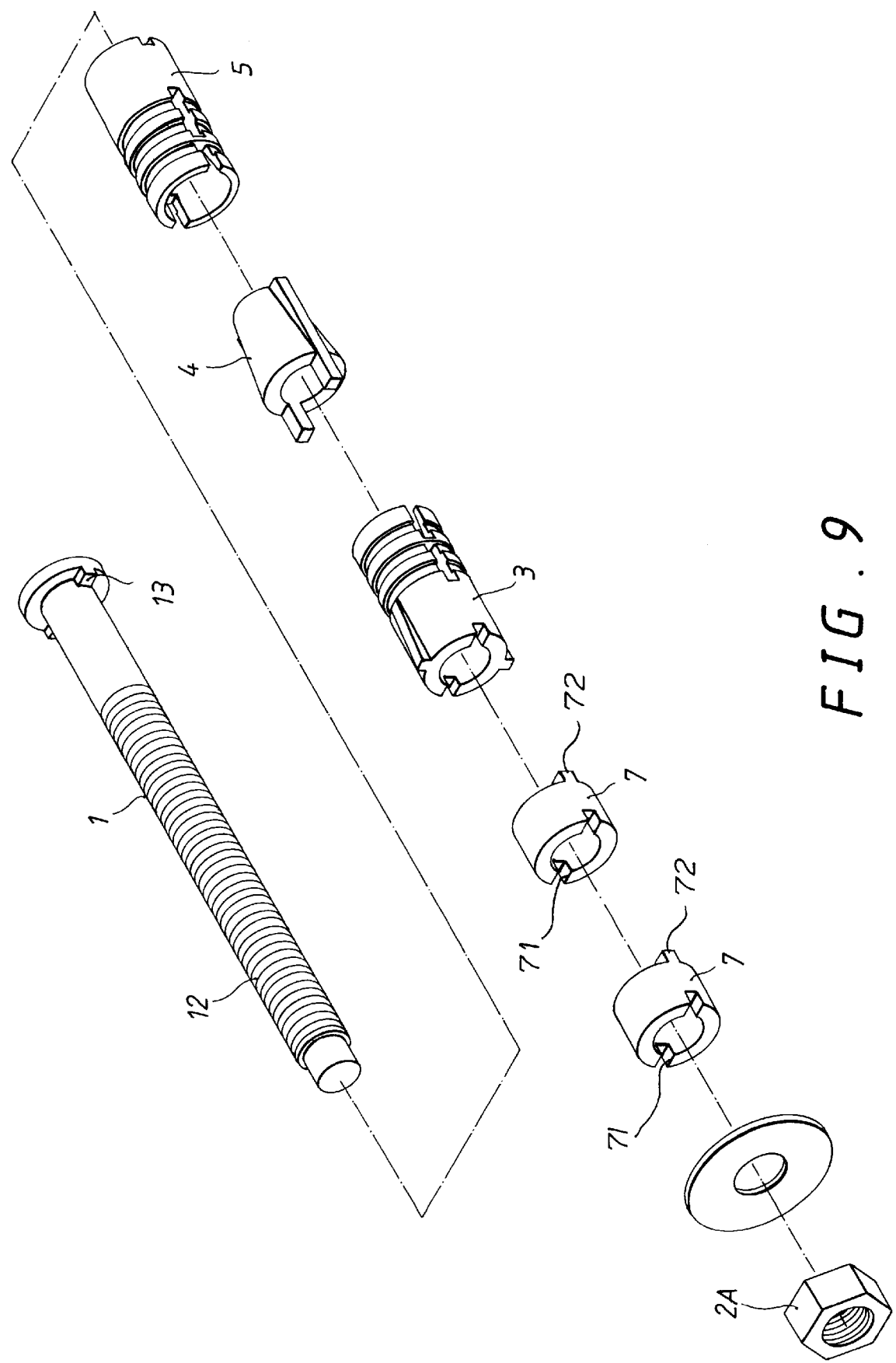
FIG. 9 is a perspective developed view illustrating addition of connecting sleeves to the basic embodiment of the present invention.
Figure 10:
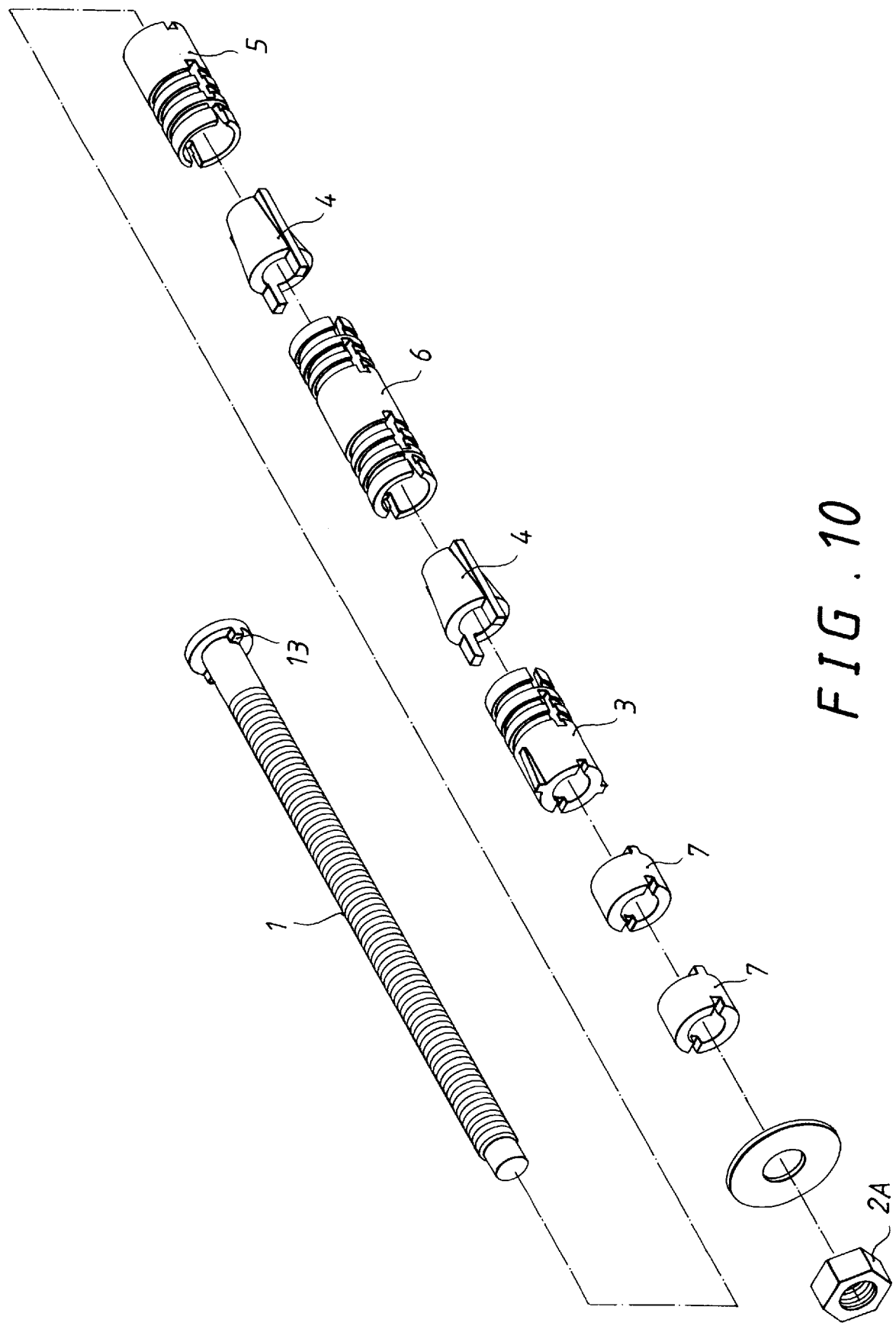
FIG. 10 is a perspective developed view illustrating connection of the bolt to the nut in the embodiment shown in FIG. 8.

Many changes and modifications in the above described embodiment of the invention can, of course, be carried out without departing from the scope hereof, such as addition to one or more connecting sleeves 7 to the basic embodiment (as shown in FIG. 9) or assembly in the reverse order (as shown in FIG. 8). Accordingly, to promote the progress in science and the useful arts, the invention is disclosed and is intended to be limited only by the scope of the appended claims.

What is claimed is:

1. An expansion screw comprising:

a) a threaded shaft having a head on a first end thereof and a second end;

b) a retaining ring located on the threaded shaft and having a tapered wall tapering in one direction such that the retaining ring a large end and a small end, the retaining ring having two symmetric blocks extending from the large end and laterally from the small end;

c) a nut threadingly engaging the second end of the threaded shaft;

d) a first expanding member located on the threaded shaft on one side of the retaining ring and having a generally cylindrical configuration with a first axially slotted end portion facing toward the retaining ring;

e) a second expanding member located on the threaded shaft on a side of the retaining ring opposite from the first expanding member, the second expanding member having a generally cylindrical configuration with a second axially slotted end portion facing toward the retaining ring, and opposite end of the second expanding member engaging one of the nut and the head to prevent relative rotation therebetween;

whereby relative rotation between the threaded shaft and the nut moves the retaining ring into the first and second slotted ends of the first and second expanding members causing the slotted ends to expand radially outwardly from the threaded shaft such that the second slotted end overlaps the first slotted end.

2. The expansion screw of claim 1 wherein the second expanding member engages the nut and further comprising at least one key extending from one of the nut and the second expanding member and at least one key slot formed in the other of the nut and the second expanding member, the at least one key located so as to enter the at least one key slot.

3. The expansion screw of claim 1 wherein the second expanding member engages the head and further comprising at least one key extending from one of the head and the second expanding member and at least one key slot formed in the other of the head and the second expansion member, the at least one key located so as to enter the at least one key slot.

4. The expansion screw of claim 1 wherein the opposite end of the second expanding member comprises a recess configured to non-rotatably accept one of the nut and the head therein.

5. The expansion screw of claim 1 wherein the first expanding member has a third axially slotted end portion facing oppositely to the first axially slotted end portion, and further comprising:
   a) a second retaining ring located on the threaded shaft and having a tapered wall tapering in one direction such that the second retaining ring has a large end and a small end, the small end facing toward the third axially slotted end, the second retaining ring having two symmetrical blocks extending from the large end and laterally from the small end; and,
   b) a third expanding member located on the threaded shaft and having a generally cylindrical configuration with a fourth axially slotted end portion facing toward the large end of the second retaining ring.

6. The expansion screw of claim 5 further comprising at least one breakable connecting rib on the first expanding member extending across a slot in the third axially slotted end portion.

7. The expansion screw of claim 1 further comprising at least one connecting sleeve located on the threaded shaft, one end of the at least one connecting sleeve having symmetrical slots thereon and at least one key axially extending from an opposite end of the at least one connecting sleeve.

8. The expansion screw of claim 1 further comprising at least one breakable connecting rib on the first expanding member extending across a slot in the first axially slotted end portion.

9. The expansion screw of claim 1 further comprising at least one breakable connecting rib on the second expanding member extending across a slot in the second axially slotted end portion.

* * * * *